(12) United States Patent
Becker et al.

(10) Patent No.: US 11,448,840 B2
(45) Date of Patent: Sep. 20, 2022

(54) UNITUBE RIBBON BREAKOUT

(71) Applicant: Preformed Line Products Co., Mayfield Village, OH (US)

(72) Inventors: Matthew Patrick Becker, University Heights, OH (US); Brendan O'Boyle, Fort Worth, TX (US)

(73) Assignee: PREFORMED LINE PRODUCTS CO., Mayfield Village, OH (US)

( * ) Notice: Subject to any disclaimer, the term of this patent is extended or adjusted under 35 U.S.C. 154(b) by 0 days.

(21) Appl. No.: 16/926,533

(22) Filed: Jul. 10, 2020

(65) Prior Publication Data
US 2021/0011236 A1 Jan. 14, 2021

Related U.S. Application Data

(60) Provisional application No. 62/872,358, filed on Jul. 10, 2019.

(51) Int. Cl.
*G02B 6/44* (2006.01)

(52) U.S. Cl.
CPC ........... *G02B 6/443* (2013.01); *G02B 6/4403* (2013.01)

(58) Field of Classification Search
CPC ..... G02B 6/4473; G02B 6/4497; G02B 6/433
See application file for complete search history.

(56) References Cited

U.S. PATENT DOCUMENTS

| | | | |
|---|---|---|---|
| 5,491,766 A | 2/1996 | Huynh et al. | |
| 5,509,099 A * | 4/1996 | Hermsen | G02B 6/4442 385/134 |
| 5,568,584 A * | 10/1996 | Smith | G02B 6/4446 385/134 |
| 5,754,724 A * | 5/1998 | Peterson | G02B 6/4446 385/135 |
| 5,908,180 A * | 6/1999 | Daoud | H02G 3/0658 248/56 |
| 6,241,200 B1 * | 6/2001 | Camporeale | F16L 3/223 248/68.1 |
| 6,738,555 B1 | 5/2004 | Cooke et al. | |
| 6,856,747 B2 | 2/2005 | Cloud et al. | |
| 7,251,411 B1 | 7/2007 | Lu et al. | |
| 8,172,465 B2 | 5/2012 | Kleeberger | |
| 9,244,243 B2 | 1/2016 | Mullaney et al. | |

(Continued)

FOREIGN PATENT DOCUMENTS

EP 3537198 A1 9/2019

OTHER PUBLICATIONS

BMW part description from at least 1999 Sold by FCP Euro (Year: 1999).*

(Continued)

*Primary Examiner* — Eric Wong
(74) *Attorney, Agent, or Firm* — Cooper Legal Group, LLC; William J. Cooper

(57) ABSTRACT

A unitube breakout kit includes a bottom portion extending from a neck end to an outlet end. A top portion is selectively attached to the bottom portion. The bottom portion and the top portion together define a central cavity configured to contain at least one of fiber optic fibers or ribbon fibers. The bottom portion defines a first pair of slots configured to cooperate with a fastener to attach at least one of fiber optic core tube or unitube ribbon cable to the bottom portion.

20 Claims, 14 Drawing Sheets

(56) References Cited

U.S. PATENT DOCUMENTS

| | | |
|---|---|---|
| 9,395,509 B2 | 7/2016 | Petersen et al. |
| 9,500,830 B2 | 11/2016 | Lu et al. |
| 2002/0064364 A1 | 5/2002 | Battey et al. |
| 2007/0257161 A1* | 11/2007 | Geppert ............... F16L 3/12 248/74.3 |
| 2010/0202740 A1 | 8/2010 | Barlowe et al. |
| 2015/0043310 A1* | 2/2015 | Maas ............... G01V 1/226 29/601 |
| 2016/0033722 A1* | 2/2016 | Ray ............... G02B 6/4446 385/135 |
| 2016/0134092 A1* | 5/2016 | Bonvallat ............ F16L 3/1222 248/68.1 |
| 2016/0209615 A1 | 7/2016 | Bakatsias et al. |
| 2016/0259142 A1* | 9/2016 | Shi ............... G02B 6/4477 |
| 2018/0157002 A1* | 6/2018 | Bishop ............... G02B 6/4441 |
| 2019/0036314 A1* | 1/2019 | Toll ............... H02G 3/0456 |
| 2019/0107681 A1* | 4/2019 | Claessens ............ G02B 6/4447 |
| 2020/0073071 A1* | 3/2020 | Allen ............... G02B 6/4471 |
| 2021/0011239 A1* | 1/2021 | Geens ............... G02B 6/4444 |

OTHER PUBLICATIONS

Corresponding International Patent Application No. PCT/US2020/041716, International Search Report and Written Opinion, dated Oct. 22, 2020.
Corresponding International Patent Application No. PCT/US2020/041716, International Preliminary Report on Patentability, dated Jan. 11, 2022.
Commscope FOSC 400 B2/B4 Installation Instructions—Fiber Optic Splice Closures, Copyright 2003, 2016—p. 6, FOSC ACC Funnel-Ribbon.
3M 2519 Cable Fanout Kit Instructions, Copyright 1996.
3M Fiber Optic Splice Closure 2178 Family Brochure, Copyright 2016.

* cited by examiner

UNITUBE RIBBON BREAKOUT

CROSS-REFERENCE TO RELATED APPLICATIONS

This application claims priority to U.S. Provisional Patent Application No. 62/872,358, filed Jul. 10, 2019, entitled "UNITUBE RIBBON BREAKOUT," which is hereby incorporated in its entirety by reference herein.

TECHNICAL FIELD

The instant application is directed toward a unitube breakout kit for ribbons of fiber optic cables. For example, the instant application is directed toward a unitube breakout kit for protecting fiber optic fibers at locations where they are divided from ribbons (e.g., large groupings) to smaller groupings.

BACKGROUND

Unitube breakout kits may be used for organizing, protecting, and breaking down unitube ribbon cables into smaller ribbon subsets prior to routing the subsets to a splice tray. Unitube breakout kits may be used to protect the fiber optic fibers from the sheath opening of unitube or other fiber optic cable sheaths.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

In some examples, a unitube breakout kit includes a bottom portion extending from a neck end to an outlet end. The unitube breakout kit also includes a top portion selectively attached to the bottom portion. The bottom portion and the top portion together define a central cavity configured to contain at least one of fiber optic fibers or ribbon fibers. The bottom portion defines a first pair of slots configured to cooperate with a fastener to attach at least one of fiber optic core tube or unitube ribbon cable to the bottom portion.

In some examples, a kit for adding a fiber optic breakout to a fiber optic splice container includes a unitube breakout kit. The unitube breakout kit includes a bottom portion extending from a neck end to an outlet end. The unitube breakout kit also includes a top portion selectively attached to the bottom portion. The bottom portion and the top portion together define a central cavity configured to contain at least one of fiber optic fibers or ribbon fibers. The bottom portion defines a first pair of slots configured to cooperate with a first fastener to attach a fiber optic cable to the bottom portion. The bottom portion defines a second pair of slots configured to cooperate with a second fastener to attach the fiber optic cable to the bottom portion.

In some examples, a unitube breakout kit includes a bottom portion extending from a neck end to an outlet end. The unitube breakout kit also includes a top portion selectively attached to the bottom portion. The bottom portion and the top portion together define a central cavity configured to contain at least one of fiber optic fibers or ribbon fibers, and the neck end contains a sheath opening of a fiber optic line comprising the at least one of fiber optic fibers or ribbon fibers.

DETAILED DESCRIPTION

Figure 1:
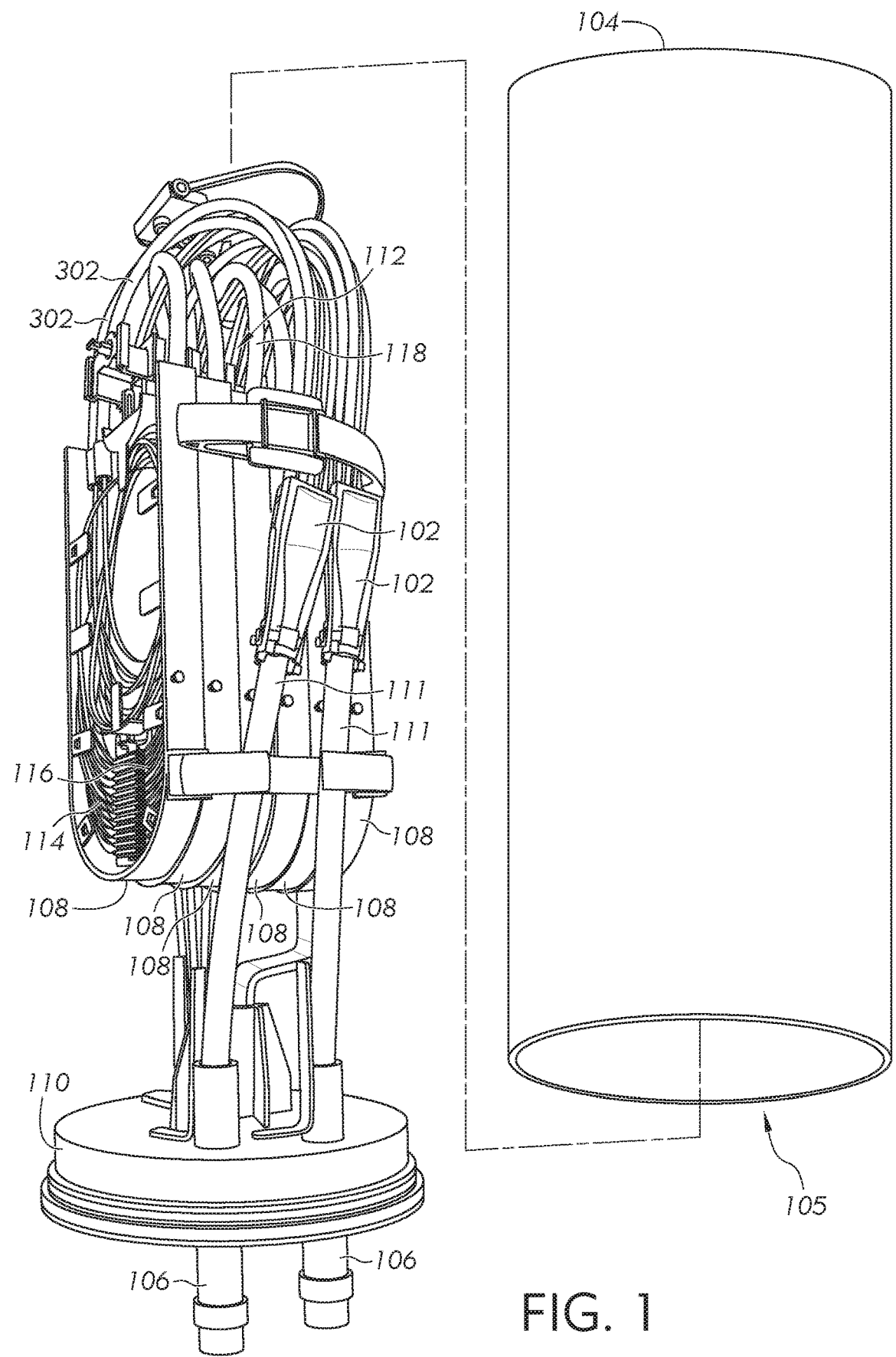
FIG. 1 is an illustration of a fiber optic splice container shown with a unitube breakout kit.

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Referring to FIG. 1, a perspective view of a unitube breakout kit 102 is shown in conjunction with fiber optic splice components. Many telecommunication distribution networks include a central office or data center (not shown) from which communication lines (e.g., fiber optic fibers) are distributed to end users. In some examples, the fiber optic fibers can be bundled within ribbons or fiber optic lines 106. The fiber optic fibers are joined (e.g., spliced) together with other fiber optic fibers at their respective end points in order to traverse the distance between the central station and the end users. In some examples, the spliced ends are located within a weather-proof container sometimes referred to as a dome 104 that can also include branched-off fibers or groups of fibers eventually leading to multiple end user locations. The dome 104 can be termed a "splice closure." In some examples, the dome 104 can include a number of splice trays 108 designed to provide a place to store the fibers and splices while preventing them from becoming damaged, misplaced, contaminated, etc.

The dome 104 can include a cover 110 that is configured to seal the interior of the dome 104 from outside elements such as rain, snow, dirt, dust, etc. As shown in FIG. 1, the fiber optic lines 106 (e.g., ribbons) pass through the cover 110 at the left of the figure and can include a number of fiber optic fibers. In some examples, the cover 110 can be a segmented end plate. In some examples, the cover 110 can be a monolithic construction. The fiber optic line 106 can be known as a "unitube ribbon cable" or other similar names. It is understood that other examples of the fiber optic lines 106 can include various quantities of fiber optic fibers, and the fiber optic lines 106 are not limited to particular quantities of fiber optic fibers. After passing through the cover 110, one or more exterior layers of the ribbon or fiber optic line 106 can be removed to expose the core tube 111.

Figure 2:
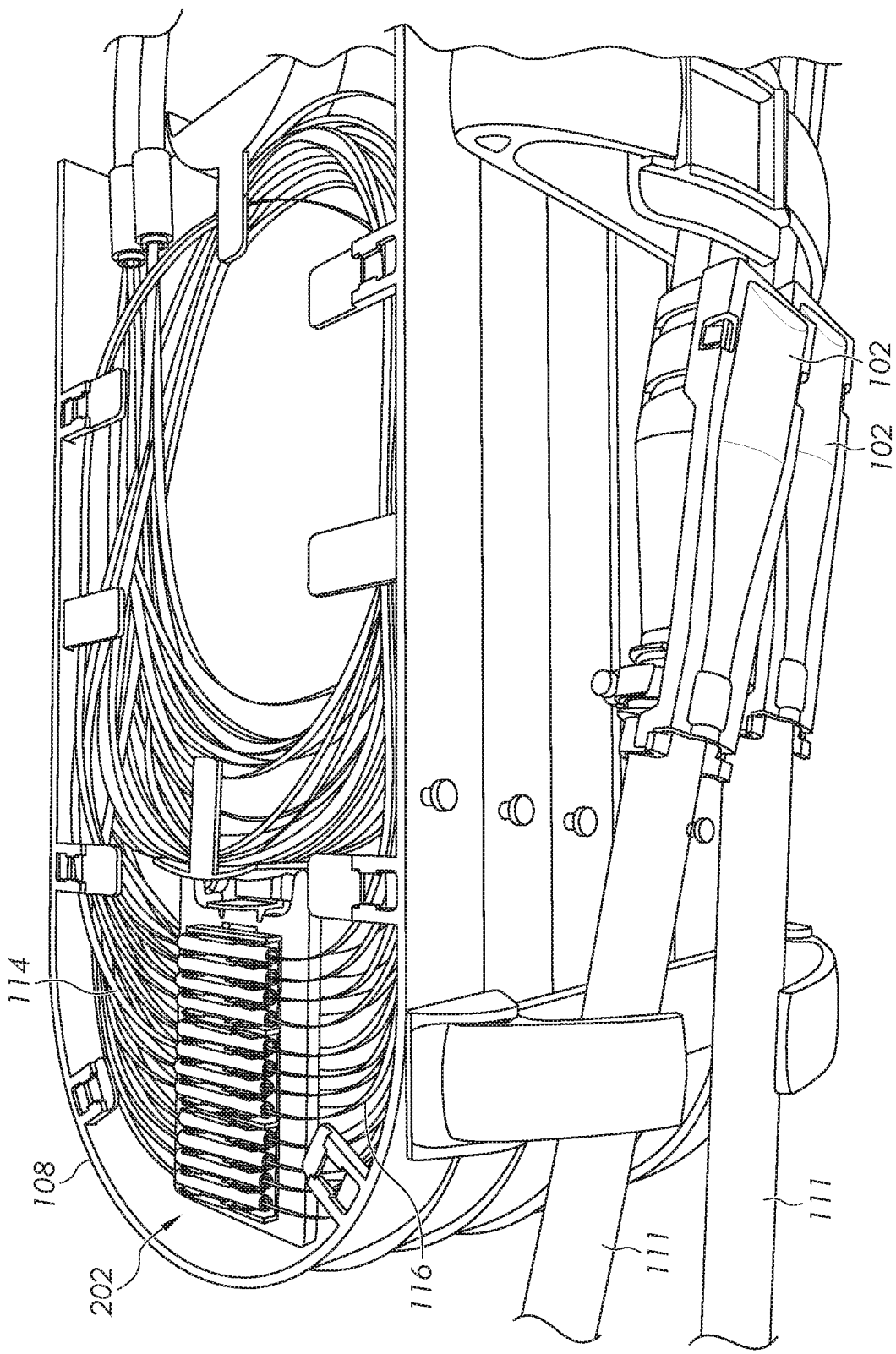
FIG. 2 is a detail view of the unitube breakout kit with the splice container.

Referring to FIG. 2, the fiber optic fibers from each fiber optic line 106 are divided into smaller groupings of fiber optic fibers so that the fiber optic fibers are more conveniently handled and can be separated into multiple splice trays 108. FIG. 2 also shows greater detail of the splice area 202 where individual fiber optic fibers are spliced together. In some examples, the splice area 202 includes splice blocks and splice protectors.

Figure 3:
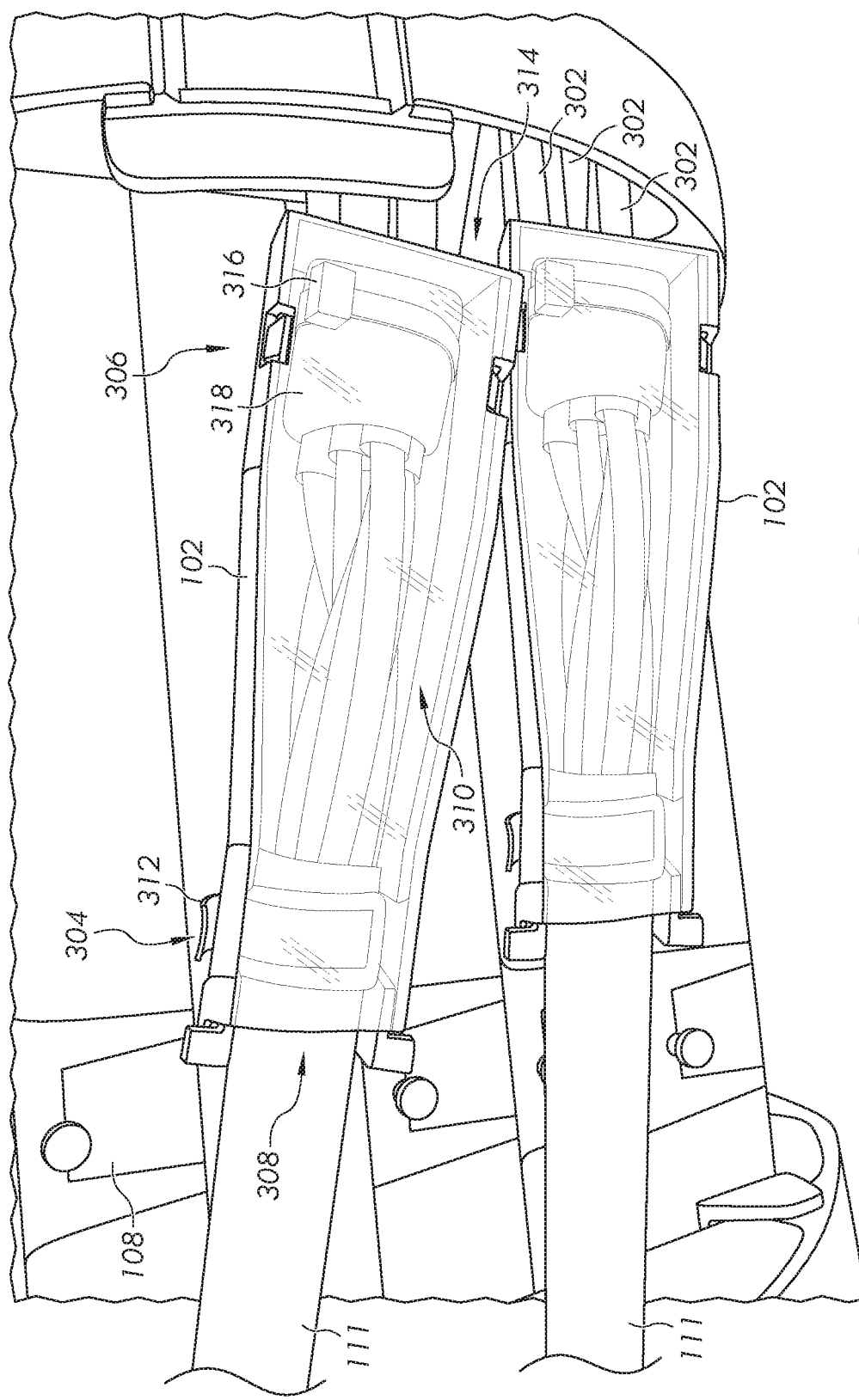
FIG. 3 is a detail view of two unitube breakout kits.

Referring to FIG. 3, the fiber optic fibers from each core tube 111 are separated into six tubes 302. Each of the six tubes 302 can include up to one hundred forty-four fiber optic fibers. As previously noted, the numbers of fiber optic fibers in each line, tube, or stack can vary, as can the number of splice trays 108 within the dome 104. As shown in FIG. 1, two tubes 302 can then be routed to a front end 112 of each splice tray 108. In some examples, the tubes 302 can be termed transition tubes. The fiber optic fibers 116 coming from the fiber optic lines 106 are then spliced together with another set of fiber optic fibers 114, and the fiber optic fibers 114 can then be placed in another tube 118 to be routed out of each splice tray 108 and back to the cover 110 where the fiber optic fibers 116 can be extended to other telecommunication network components (e.g., end user devices).

Returning to FIG. 3, the unitube breakout kit 102 extends between a neck end 304 and an outlet end 306. The neck end 304 defines an aperture 308 to enable a core tube 111 of a unitube fiber optic cable 106 to enter a central cavity 310 of the unitube breakout kit 102. The aperture 308 can be sized to accommodate a number of different sizes of fiber optic lines 106. In some examples, the number of different size unitube fiber optic lines include industry standard sizes 864F and down. The neck end 304 can work cooperatively with a fastener 312 (e.g., a hose clamp or a tie wrap) to help secure the unitube breakout kit 102 to the fiber optic line 106 as will be described below.

The outlet end 306 also defines an aperture 314 to enable a number of tubes 302 to pass from the central cavity 310 to a space outside the unitube breakout kit 102. The outlet end 306 can work cooperatively with one or more fasteners 316 (e.g., a wire tie) to help secure the unitube breakout kit 102 to the tubes 302 as will be described below. While not necessary, the fastener 316 can wrap around the tubes 302 while having a portion of relatively soft material 318 (e.g., felt) located between the fastener 316 and the tubes 302.

Figure 4:
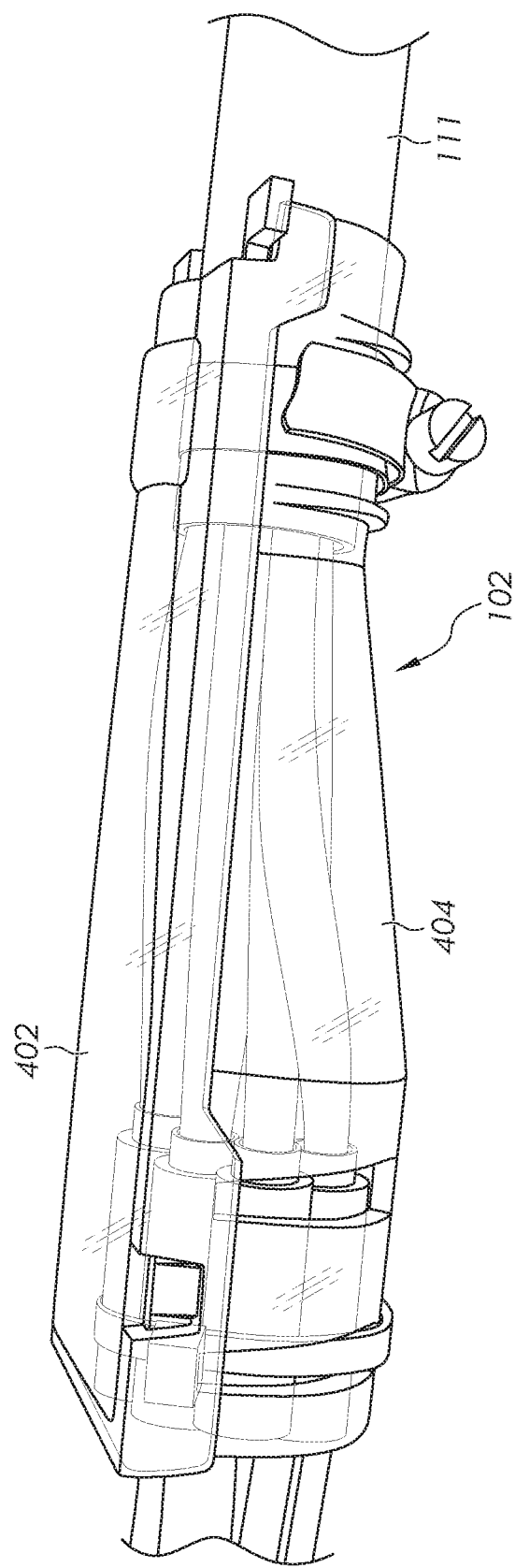
FIG. 4 is an elevation view of a unitube breakout kit.

Referring to FIG. 4, an elevation view of the unitube breakout kit 102 is shown. The unitube breakout kit 102 can include a top portion 402 and a bottom portion 404. Any suitable material can be used to construct the top portion 402 and the bottom portion 404. In some examples, the top portion 402 and the bottom portion 404 are constructed of plastic that is translucent. In some examples, the top portion 402 and the bottom portion 404 are at least partly transparent, meaning that some portions of the top portion 402 and the bottom portion 404 enable a clear view of the tubes 302 located within the top portion 402 and the bottom portion 404.

Figure 5:
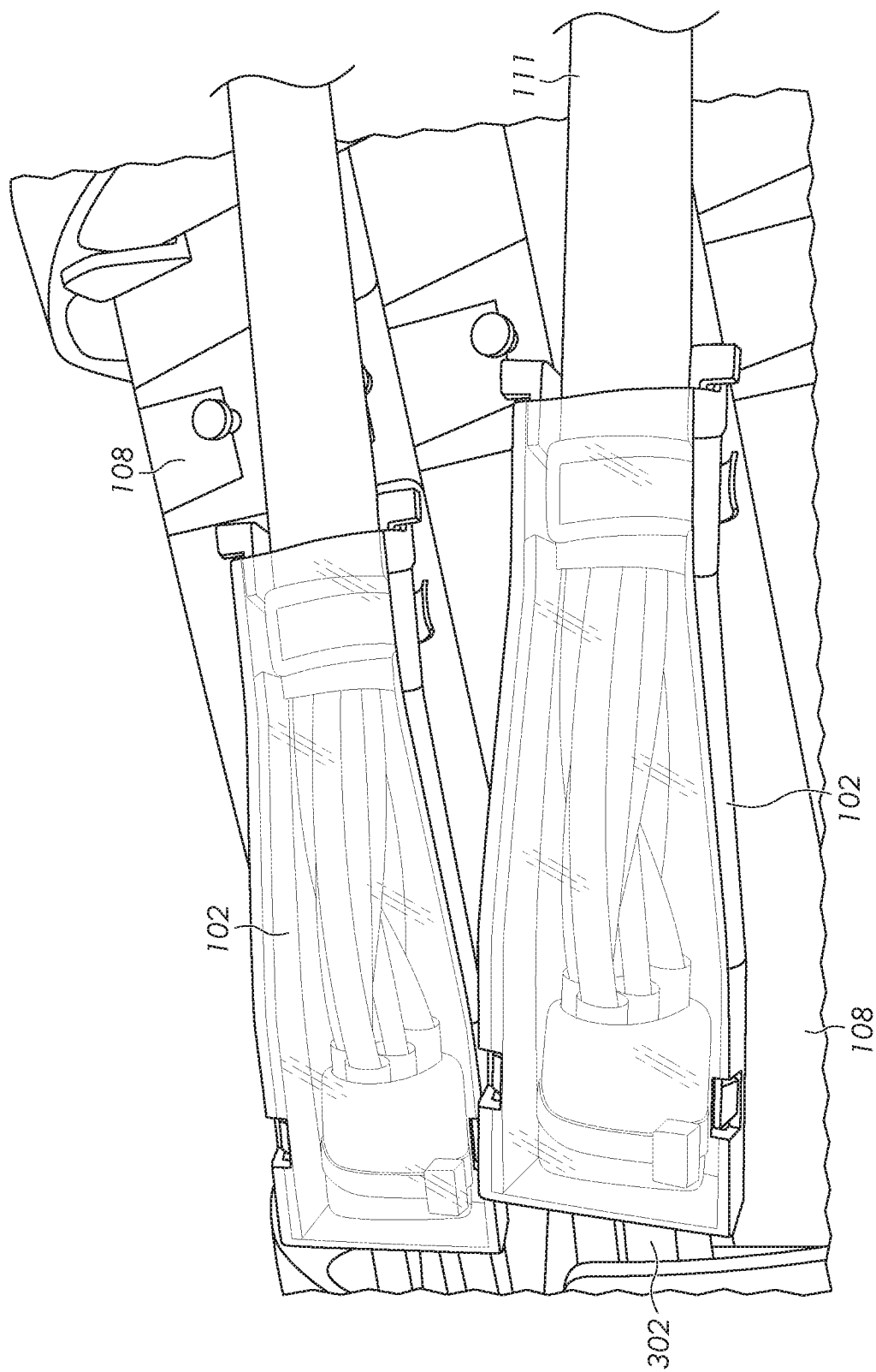
FIG. 5 is similar to FIG. 3.

Referring to FIG. 5, the unitube breakout kits 102 are shown in a side-by-side orientation on the outside of the splice trays 108 in a perspective view. Other orientations are also contemplated.

Figure 6:
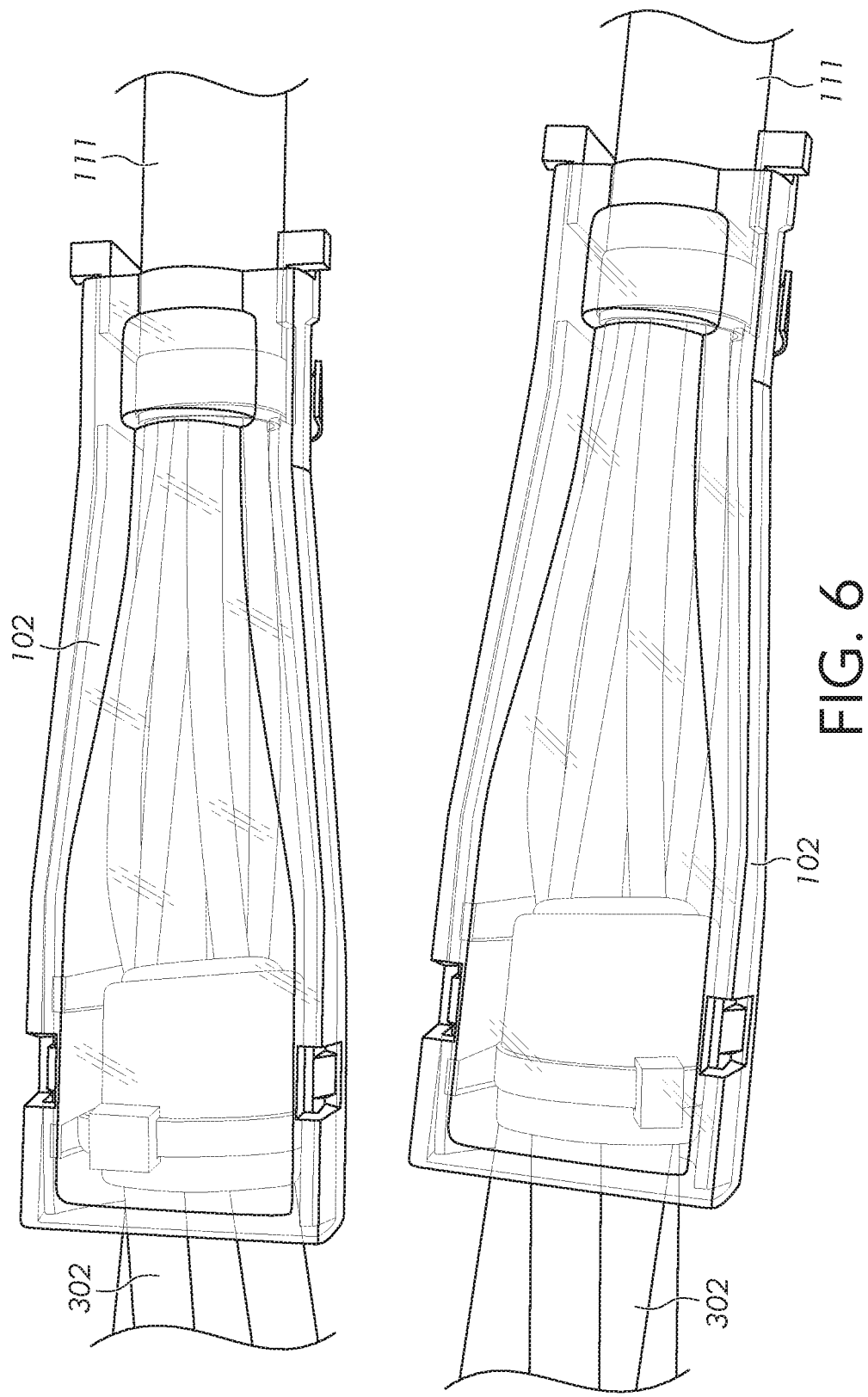
FIG. 6 is similar to FIG. 3.
Figure 7:
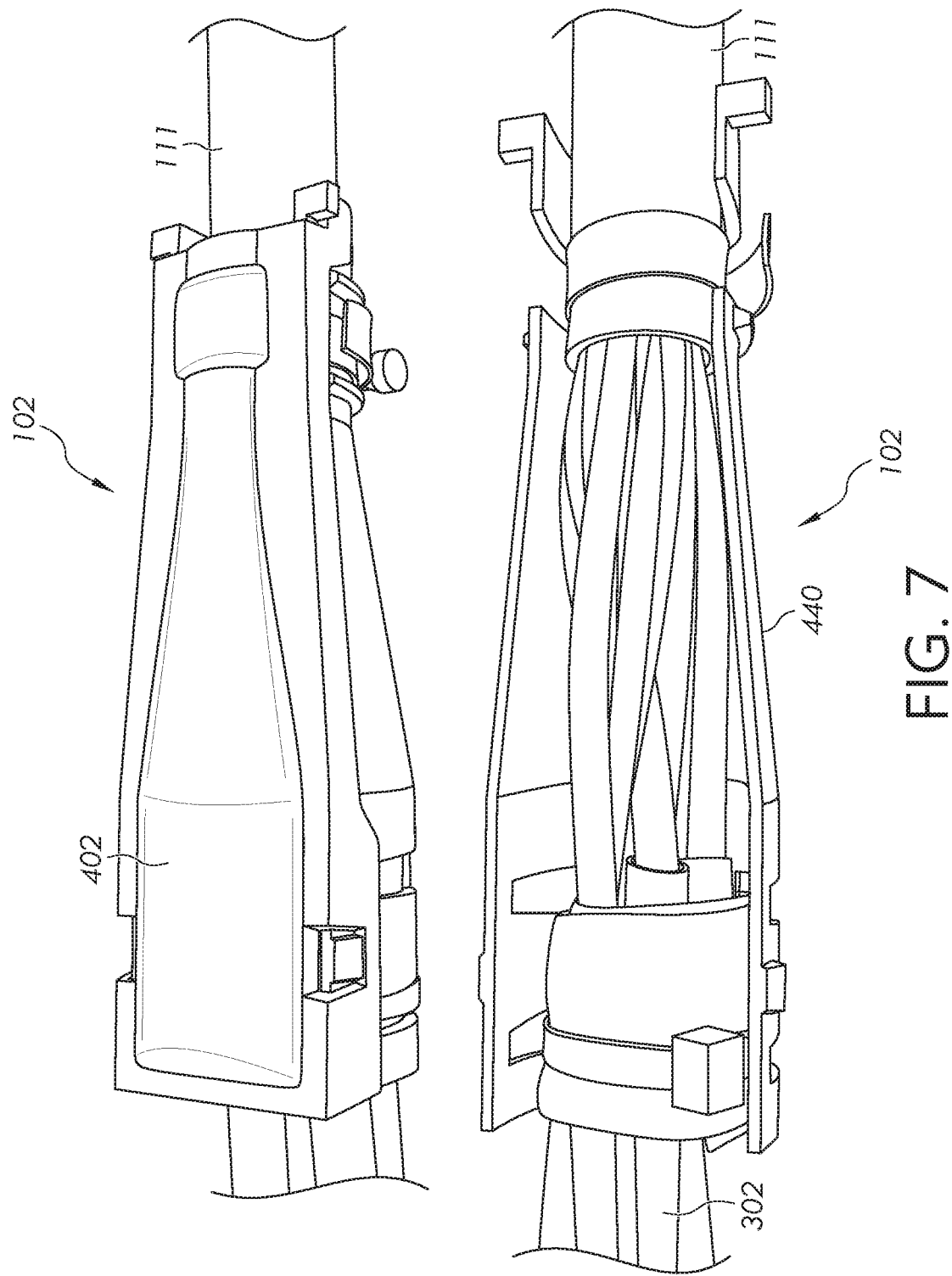
FIG. 7 is similar to FIG. 6 showing a bottom portion of one unitube breakout kit after removal of a top portion.

Referring to FIG. 6, the unitube breakout kits 102 are shown in an elevation view. As shown in FIGS. 6 and 7, groups of optic fibers are separated into a plurality of groupings within the unitube breakout kit. In some examples, the groups of fiber optic fibers are bound together in the manufacturing process of the fiber optic cable 106 such that there are several bundles of fiber optic fibers within the core tube 111.

In some examples, the bundles can be separated within the unitube breakout kit 102 such that the bundles enter the neck end 304 of the unitube breakout kit 102 in a first quantity within the core tube 111, and the bundles can leave the unitube breakout kit 102 separated into various tubes 302. The quantity of bundles within each tube 302 can be less than the quantity of the bundles within the core tube 111.

Referring to FIG. 7, a perspective view of the unitube breakout kits 102 is shown. In some examples, the top portion 402 of the unitube breakout kit 102 can be opened with respect to the bottom portion 404. In some examples, the top portion 402 can be completely separable from the bottom portion 404. In some examples, the top portion 402 can be hinged to the bottom portion 404.

Figure 8:
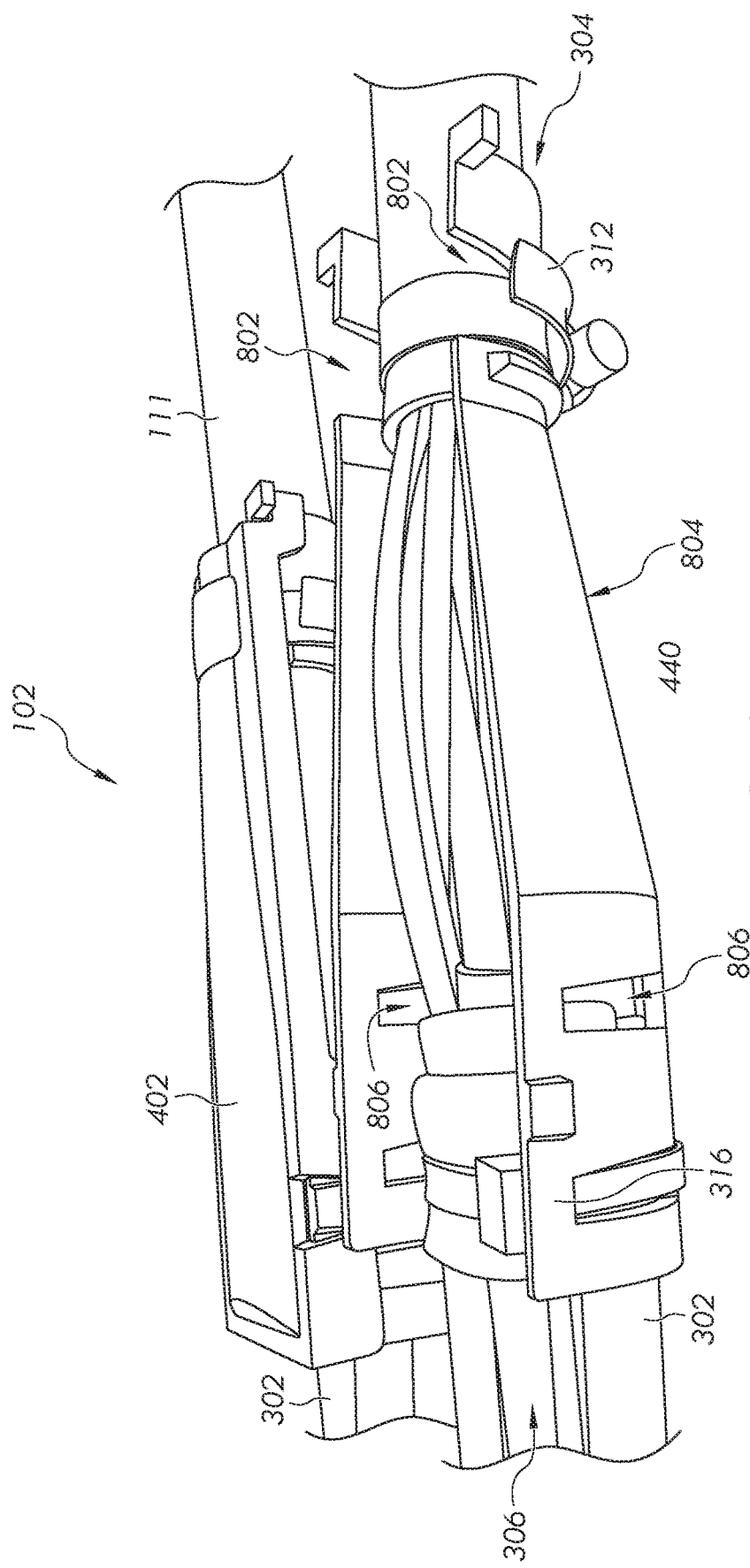
FIG. 8 is similar to FIG. 4 showing the bottom portion of one unitube breakout kit after removal of the top portion.

Referring to FIG. 8, the bottom portion 404 can define a pair of slots 802 at the neck end 304. Because the top portion 402 can be opened with respect to the bottom portion 404, the fastener 312 can be placed above a portion of the fiber optic line 106, placed through the pair of slots 802 on opposing sides of the bottom portion 404, and then around a bottom surface 804 of the bottom portion 404. The pair of slots 802 are not continuous around the bottom portion 404 (e.g., not contiguous), so the fastener 312 can pass to a space outside of the unitube breakout kit 102 and help secure the fiber optic line 106 to the bottom portion 404.

Similarly, the bottom portion 404 can define a pair of slots 806 at the outlet end 306. Because the top portion 402 can be opened with respect to the bottom portion 404, the fastener 316 can be placed above the tubes 302, placed through the pair of slots 806 on opposing sides of the bottom portion 404, and then around the bottom surface 804 of the bottom portion 404. The pair of slots 806 are not continuous around the bottom portion 404 (e.g., not contiguous), so the fastener 316 can pass to a space outside of the unitube breakout kit 102 and help secure the tubes 302 to the bottom portion 404.

Figure 9:
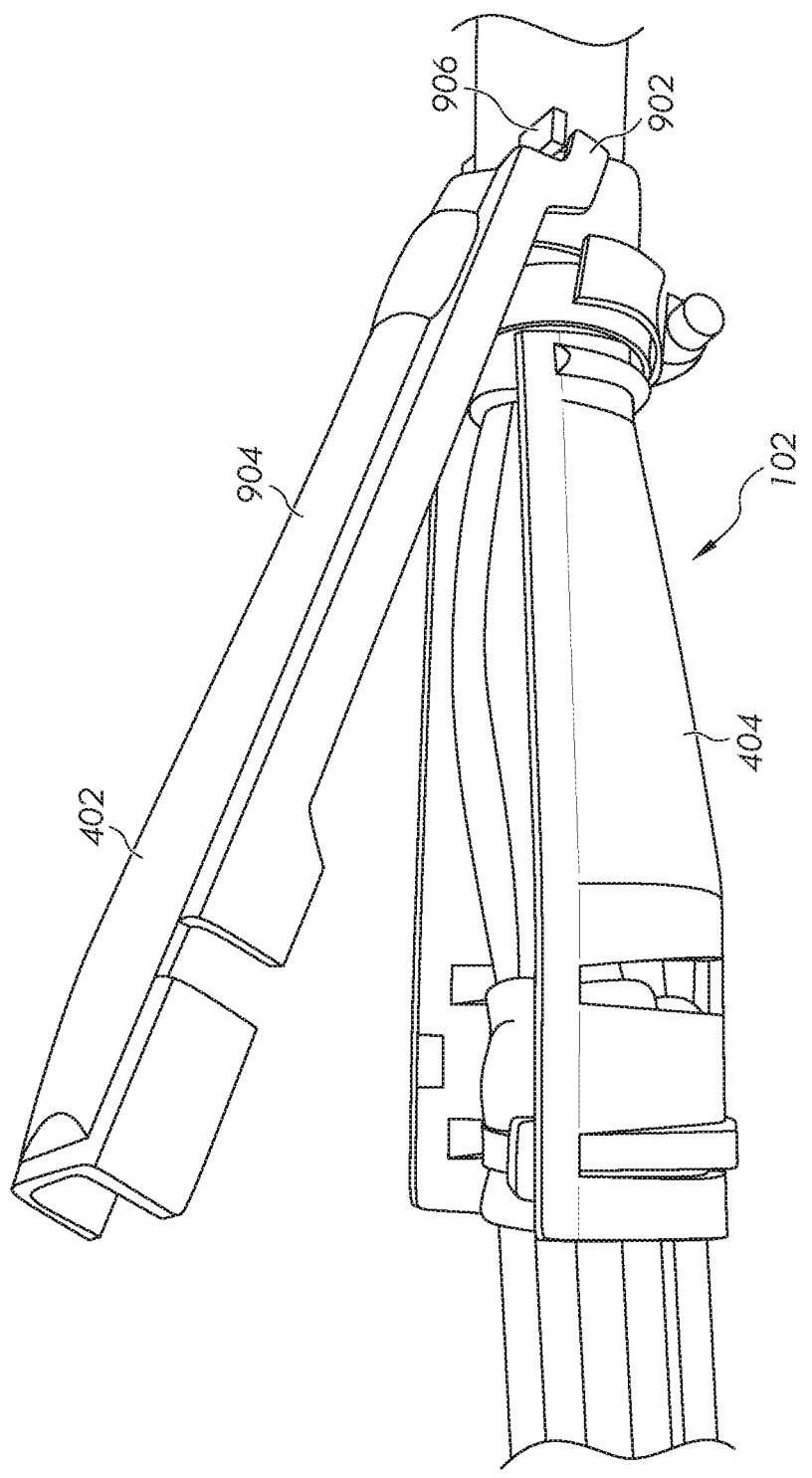
FIG. 9 is similar to FIG. 4 showing the top portion of the unitube breakout kit rotated relative to the bottom portion.

Referring to FIG. 9, the top portion 402 of the unitube breakout kit 102 can include tabs 902 that extend away from the main body 904 of the top portion 402, generally parallel with a longitudinal axis of the unitube breakout kit 102. The tabs 902 can cooperate with tabs 906 that extend away from the bottom portion 404 in a direction perpendicular to the longitudinal axis of the unitube breakout kit 102. This arrangement can enable the top portion 402 to rotate relative to the bottom portion 404. In some examples, the top portion 402 rotates about an axis that is perpendicular to the longitudinal axis of the unitube breakout kit 102.

Figure 10:
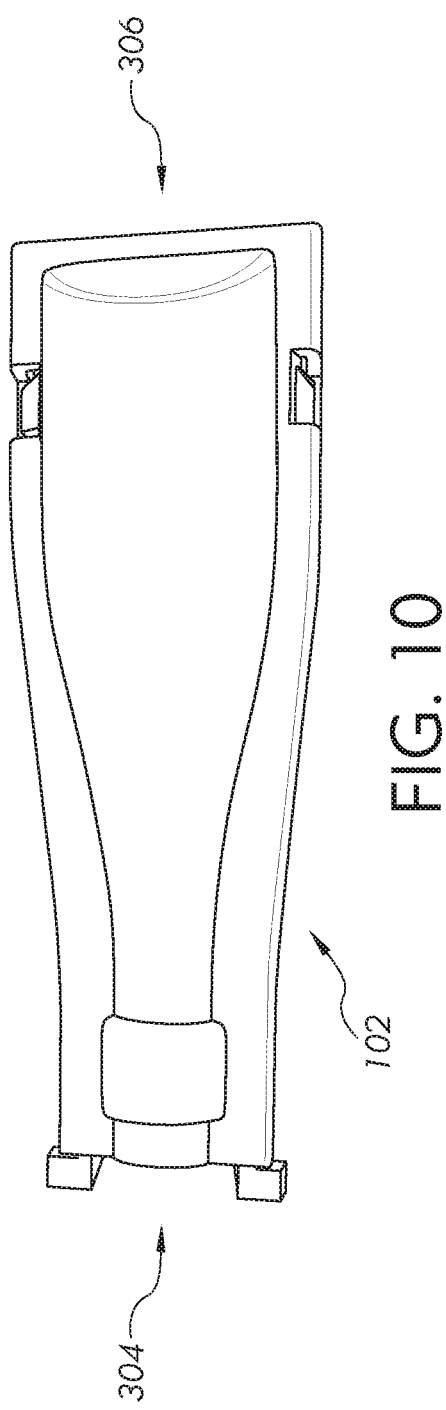
FIG. 10 is a top view of the unitube breakout kit shown omitting other components.

Referring to FIG. 10, a top view of the unitube breakout kit 102 is shown with no other components. In some examples, the neck end 304 is smaller in cross-sectional area than the outlet end 306.

Figure 11:
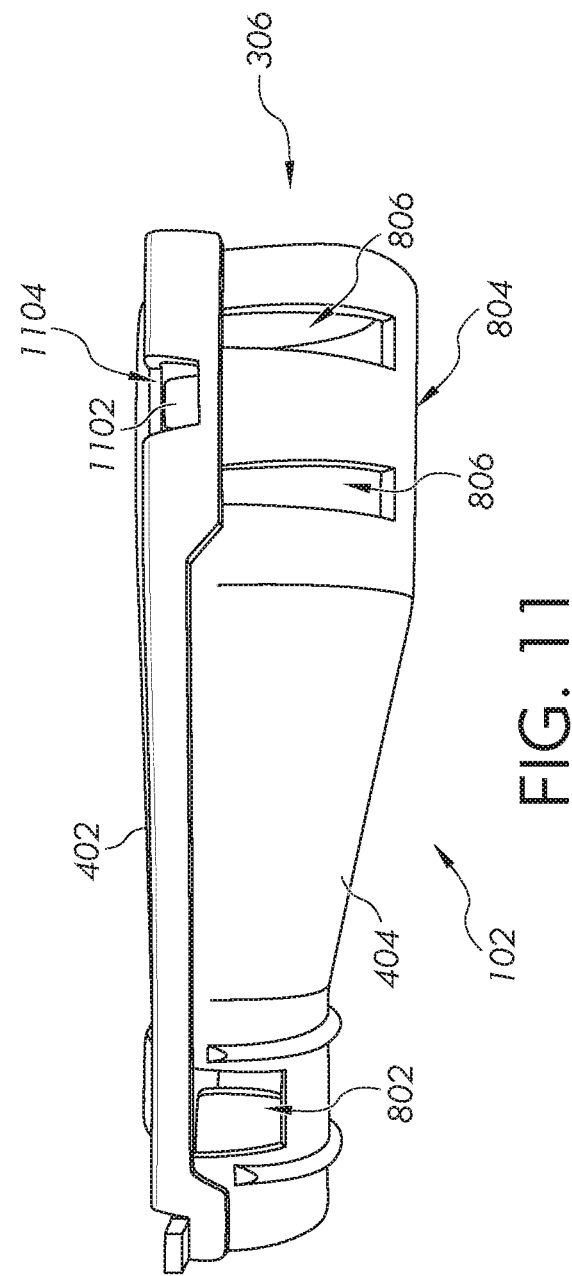
FIG. 11 is an elevation view of the top portion and the bottom portion shown omitting other components.

Referring to FIG. 11, an elevation view of the unitube breakout kit 102 is shown with no other components. As previously described, each portion of the pair of slots 802 are not contiguous and the pair of slots 806 are not contiguous, and thus, the bottom surface 804 passes longitudinally between the pair of slots 802 and between the pair of slots 806. Additionally, at least one of the top portion 402 or the bottom portion 404 can include tabs 1102 at the outlet end 306. The tabs 1102 can cooperate with an opening 1104 defined by at least one of the top portion 402 or the bottom portion 404 to help secure the top portion 402 to the bottom portion 404. In other words, the tabs 1102 can at least partially move into the openings 1104 to latch or "click" into position.

Figure 12:
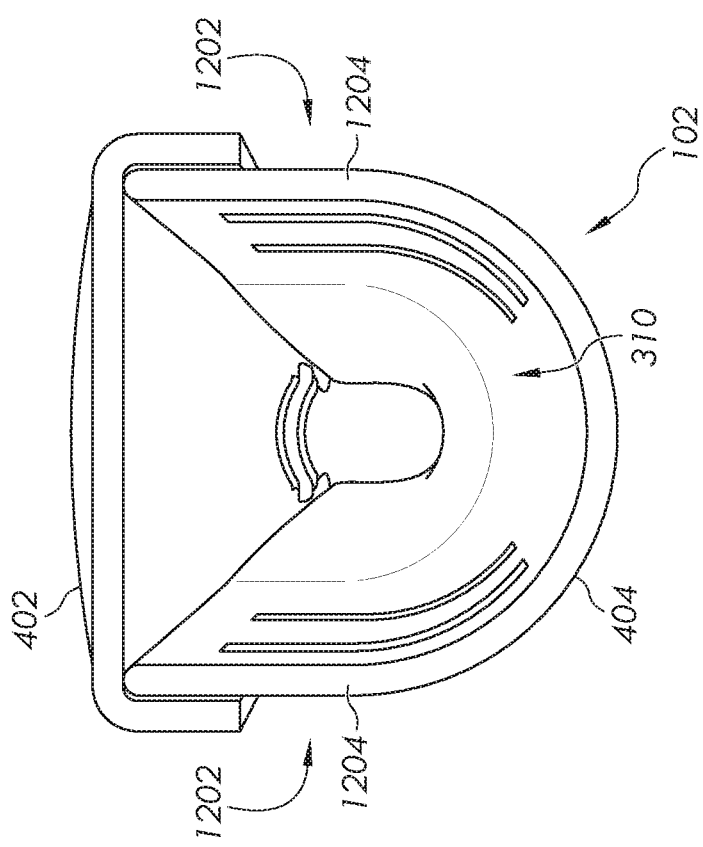
FIG. 12 is an end view of the top portion and the bottom portion shown from an outlet end.

Referring to FIG. 12, an end view of the unitube breakout kit 102 from the outlet end 306 is shown. As desired, an operator can apply a force in the direction of arrows 1202 to deflect a set of sidewalls 1204 toward the central cavity 310. This movement removes the tabs 1102 from the opening 1104 (shown in FIG. 11) to enable the top portion 402 to separate from the bottom portion 404 (e.g., by rotation, translation, etc.)

Figure 13:
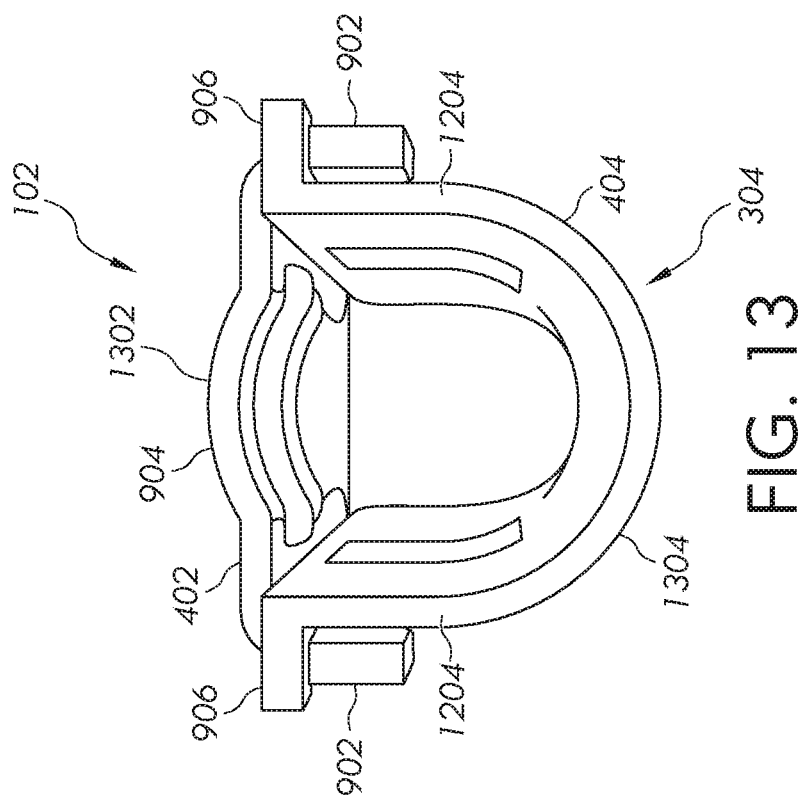
FIG. 13 is an end view of the top portion and the bottom portion shown from a neck end.

Referring to FIG. 13, an end view of the unitube breakout kit 102 from the neck end 304 is shown. As shown the top portion 402 can be substantially flat with a relatively small arch 1302. The bottom portion 404 can include an arc 1304 (e.g., a circular arc) and sidewalls 1204. This view also shows the tabs 902 that extend away from the main body 904 of the top portion 402 and the tabs 906 that extend away from the bottom portion 404 in a direction perpendicular to the longitudinal axis of the unitube breakout kit 102.

Figure 14:
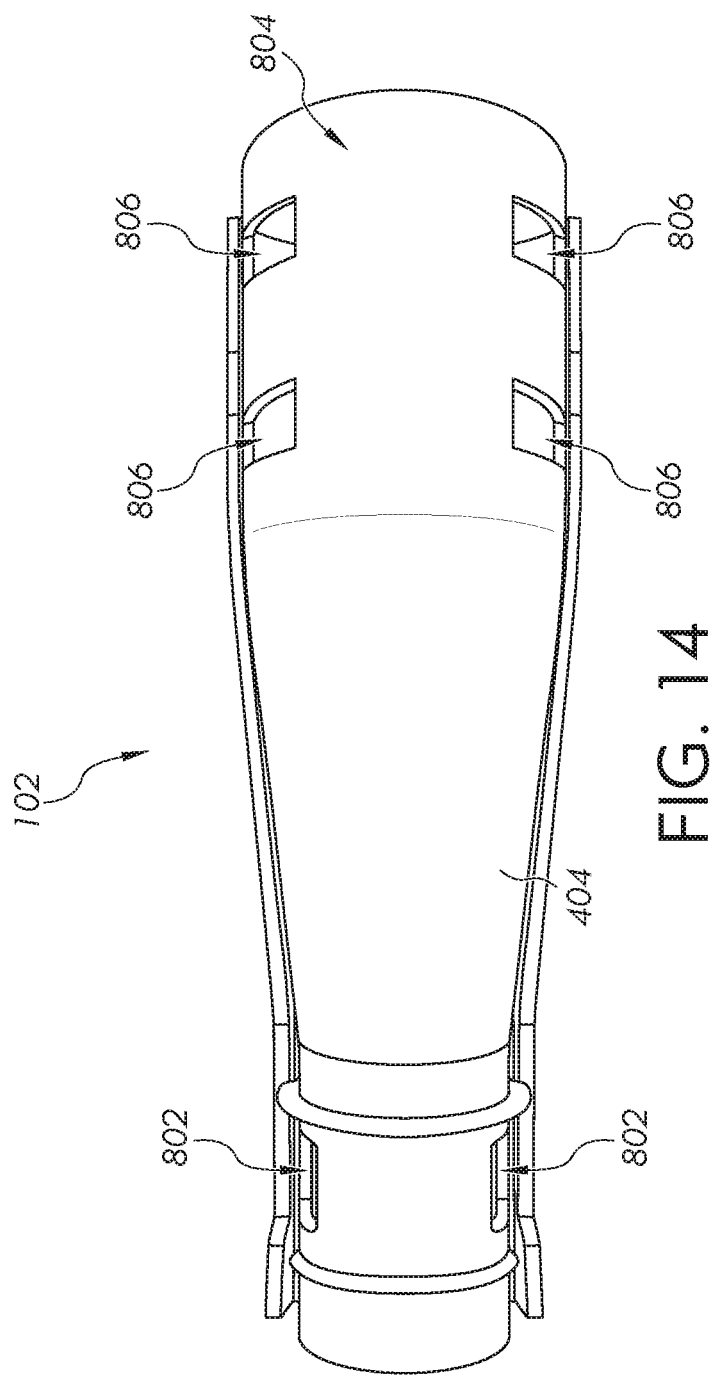
FIG. 14 is a bottom view of the bottom portion.

Referring to FIG. 14, a bottom view of the unitube breakout kit 102 is shown. As discussed previously, the bottom portion 404 includes pairs of slots 802, 806 that enable fasteners to attach the fiber optic line 106 and the tubes 302 (shown in FIG. 1) to the bottom portion 404. The pairs of slots 802, 806 do not extend around the bottom surface 804 of the bottom portion 404.

Figure 15:
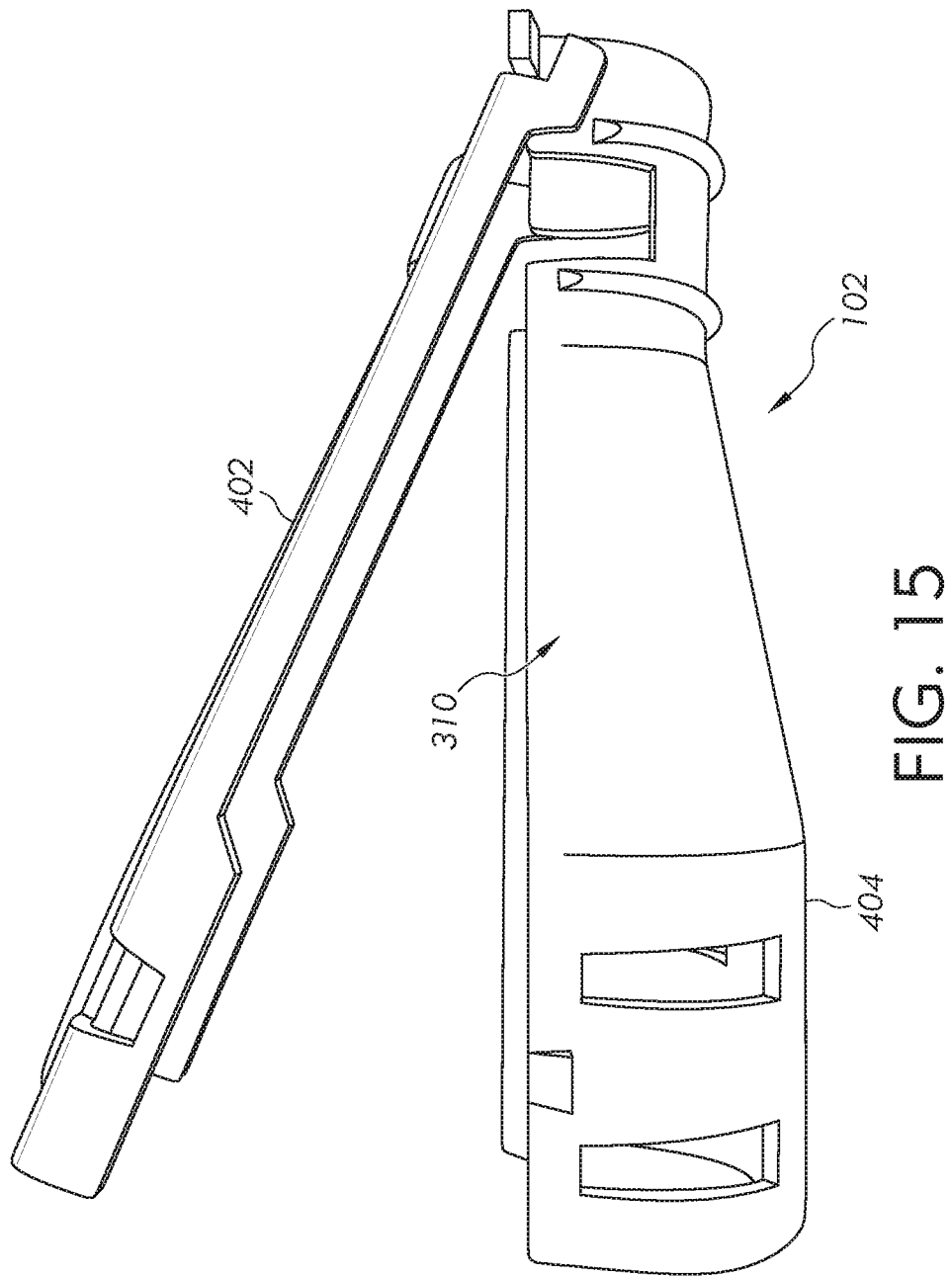
FIG. 15 is similar to FIG. 9.

Referring to FIG. 15, an elevation view of the unitube breakout kit 102 is shown with the top portion 402 rotated with respect to the bottom portion 404 to permit user access into the central cavity 310.

Figure 16:
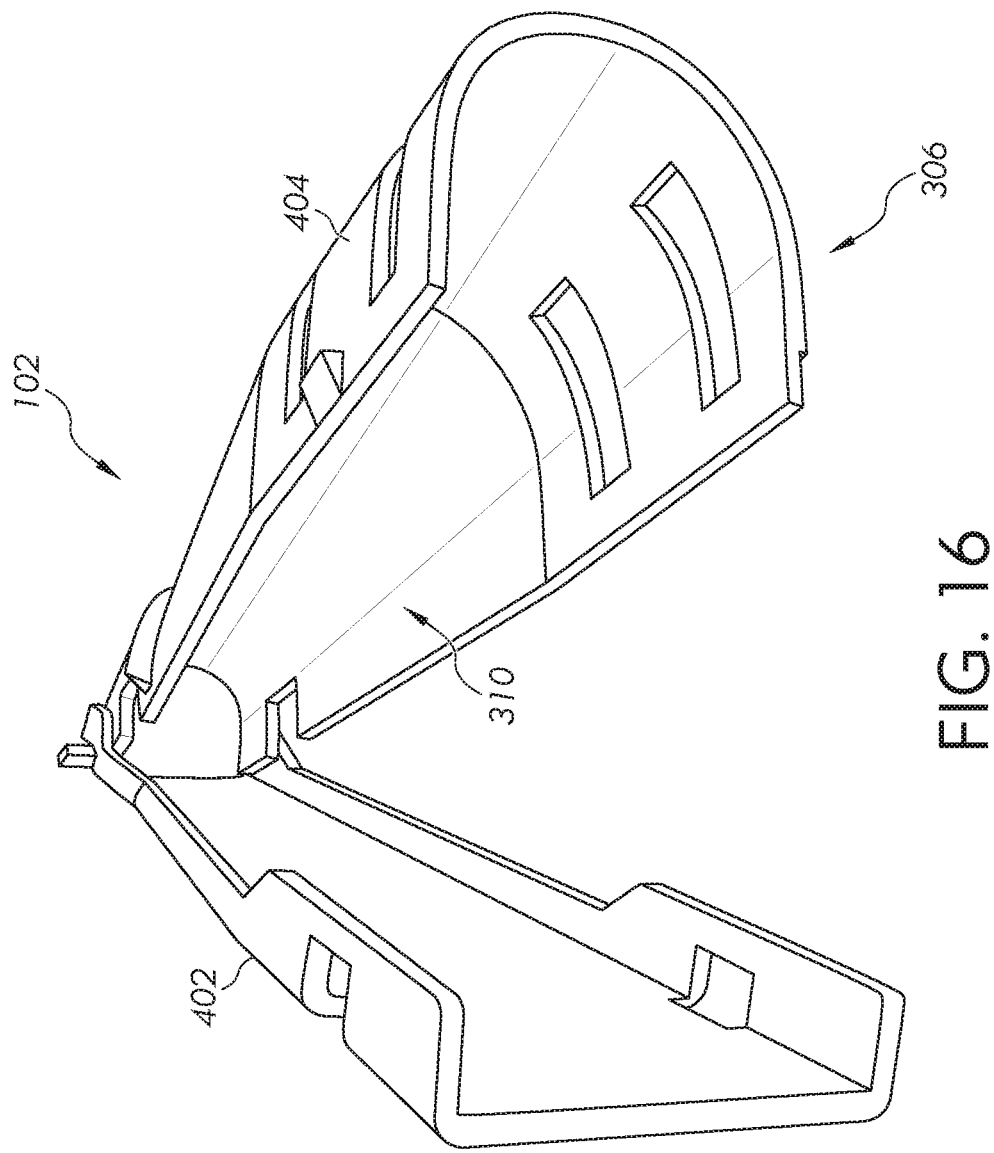
FIG. 16 is a perspective view of showing the top portion of the unitube breakout kit rotated relative to the bottom portion.

Referring to FIG. 16, a perspective view of the unitube breakout kit 102 is shown from the outlet end 306.

Use of the described unitube breakout kit can provide multiple benefits. The unitube breakout kit can provide improved organization within the dome for the fiber optic lines. In some examples, the improved organization can increase the number of fiber optic fibers that can be included in the dome. Additionally, the described unitube breakout kit can provide a standardized, repeatable set of steps to splitting the fiber optic fibers. Many known splitting processes are left to a technician in the field, resulting in varied quality and varied serviceability. Improved standardization and repeatability for the fiber optic fiber splitting and splicing dome can be beneficial, as the task demands a substantial amount of time and the equipment can be costly.

Another benefit of the described unitube breakout kit can include the elimination of a need for a relatively large slack basket to house the slack storage of fiber optic lines. A relatively large slack basket can limit the number of splice trays housed within the splice closure.

Yet Another benefit of the described unitube breakout kit can include increased protection of the fiber optic fibers from the sheath openings of the unitube fiber optic line. Similarly, the described unitube breakout kit can include increased protection of the fiber optic fibers from the openings (e.g., edges) of the sheath that extend from the unitube breakout kit to the splice tray. In some examples, at least one of the pair of slots or the second pair of slots is located at the neck end of the bottom portion and at least one of the pair of slots or the second pair of slots is located at the outlet end of the bottom portion to attach the fiber optic line and the tubes to the bottom portion. This fastening arrangement can reduce or eliminate relative motion of the fiber optic fibers to the sheath opening of the fiber optic line, thereby reducing wear, abrasion, or breaking of the fiber optic fibers.

Still another benefit of the described unitube breakout kit can include the transparency of at least one of the top portion or the bottom portion enabling a technician to ensure there is no pinching of optic fibers that will be caught between any surfaces of the unitube breakout kit.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first location and a second location correspond to location A and location B or two different or two identical locations or the same location.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are to be construed to mean "one or more" unless specified otherwise or clear from context to be directed to a singular form. Also, at least one of A and B or the like means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A unitube breakout kit comprising:
a bottom portion extending from a neck end to an outlet end; and
a top portion selectively attached to the bottom portion via a first tab extending from the top portion and a second tab extending from the bottom portion proximate the neck end such that the top portion is pivotally movable, about a pivot point proximate the neck end, between a closed position and an open position relative to the bottom portion due to interaction of the first tab with the second tab, wherein the bottom portion and the top portion together define a central cavity configured to contain at least one of fiber optic fibers or ribbon fibers when the top portion is in the closed position, wherein:
the bottom portion defines slot proximate the neck end and configured to cooperate with a fastener to attach at least one of a fiber optic core tube containing the fiber optic fibers or a unitube ribbon cable containing the ribbon fibers to the bottom portion, and
at least one of the fiber optic core tube or the unitube ribbon cable remains attached to the to the bottom portion, due to the fastener cooperating with the slot defined by the bottom portion, when the top portion is in the open position.

2. The unitube breakout kit of claim 1, wherein the top portion and the bottom portion are constructed of plastic.

3. The unitube breakout kit of claim 1, wherein the neck end includes a smaller cross-sectional area than a cross-sectional area of the outlet end.

4. The unitube breakout kit of claim 1, wherein the top portion is translucent.

5. The unitube breakout kit of claim 1, wherein the bottom portion is translucent.

6. The unitube breakout kit of claim 1, wherein the bottom portion includes an arc and parallel sidewalls, wherein the arc is between the parallel sidewalls.

7. The unitube breakout kit of claim 1, wherein, when the fastener cooperates with the slot defined by the bottom portion, the fastener passes through the slot such that a first portion of the fastener is located within the central cavity and a second portion of the fastener is located outside the bottom portion.

8. The unitube breakout kit of claim 1, wherein the first tab underlies the second tab when the top portion is in the closed position.

9. The unitube breakout kit of claim 8, wherein the first tab underlies the second tab when the top portion is in the open position.

10. The unitube breakout kit of claim 1, wherein the first tab underlies the second tab when the top portion is in the open position.

11. The unitube breakout kit of claim 1, wherein the fastener is at least one of a hose clamp or a zip tie.

12. A kit for adding a fiber optic breakout to a fiber optic splice container comprising a splice tray within which at least one of fiber optic fibers or ribbon fibers are spliced, the kit comprising:
a unitube breakout kit, outside the splice tray, comprising:
a bottom portion extending from a neck end to an outlet end; and
a top portion selectively attached to the bottom portion, wherein the bottom portion and the top portion together define a central cavity configured to contain at least one of the fiber optic fibers or the ribbon fibers, wherein:
the bottom portion defines, proximate the neck end, at least one first slot configured to cooperate with a first fastener to attach at least one of a fiber optic cable containing the fiber optic fibers or a unitube ribbon cable containing the ribbon fibers to the bottom portion, and
the bottom portion defines, proximate the outlet end, at least one second slot configured to cooperate with a second fastener to attach at least one of the fiber optic fibers splayed out of the fiber optic cable or the ribbon fibers splayed out of the unitube ribbon cable to the bottom portion and for routing of at least one of the fiber optic fibers splayed out of the fiber optic cable or the ribbon fibers splayed out of the unitube ribbon cable to the splice tray.

13. The kit of claim 12, wherein the first fastener is at least one of a hose clamp or a zip tie.

14. The kit of claim 12, wherein the second fastener is a wire tie.

15. The kit of claim 12, comprising a piece of deformable material configured to be placed between the second fastener and at least one of the fiber optic fibers splayed out of the fiber optic cable or the ribbon fibers splayed out of the unitube ribbon cable.

16. The kit of claim 12, wherein the neck end has a first cross-sectional area and the outlet end has a second cross-sectional area greater than the first cross-sectional area.

17. The kit of claim 16, wherein at least one of the fiber optic cable or the unitube ribbon cable has a third cross-sectional area and at least one of the fiber optic fibers splayed out of the fiber optic cable or the ribbon fibers splayed out of the unitube ribbon cable have a fourth cross-sectional area greater than the third cross-sectional area.

18. A unitube breakout kit comprising:
a bottom portion extending from a neck end to an outlet end; and
a top portion selectively attached to the bottom portion, wherein:
the bottom portion and the top portion together define a central cavity configured to contain at least one of fiber optic fibers or ribbon fibers, wherein the neck end has a first cross-sectional area and the outlet end has a second cross-sectional area greater than the first cross-sectional area,
the top portion is pivotally movable about a pivot point proximate the neck end between a closed position and an open position relative to the bottom portion,
when the top portion is in the closed position, the central cavity is generally not accessible, and
when the top portion is in the open position, the central cavity is generally accessible.

19. The unitube breakout kit of claim 18, comprising at least one of:

a first fastener, proximate the neck end, to attach at least one of a fiber optic cable containing the fiber optic fibers or a unitube ribbon cable containing the ribbon fibers to the bottom portion, or a second fastener, proximate the outlet end, to attach at least one of the fiber optic fibers splayed out of the fiber optic cable or the ribbon fibers splayed out of the unitube ribbon cable to the bottom portion.

20. The unitube breakout kit of claim 19, wherein at least one of the fiber optic cable or the unitube ribbon cable has a third cross-sectional area and at least one of the fiber optic fibers splayed out of the fiber optic cable or the ribbon fibers splayed out of the unitube ribbon cable have a fourth cross-sectional area greater than the third cross-sectional area.

* * * * *